C. E. WHITE.
INTERNAL COMBUSTION PUMP.
APPLICATION FILED NOV. 13, 1913.
1,157,071.
Patented Oct. 19, 1915.
4 SHEETS—SHEET 4.
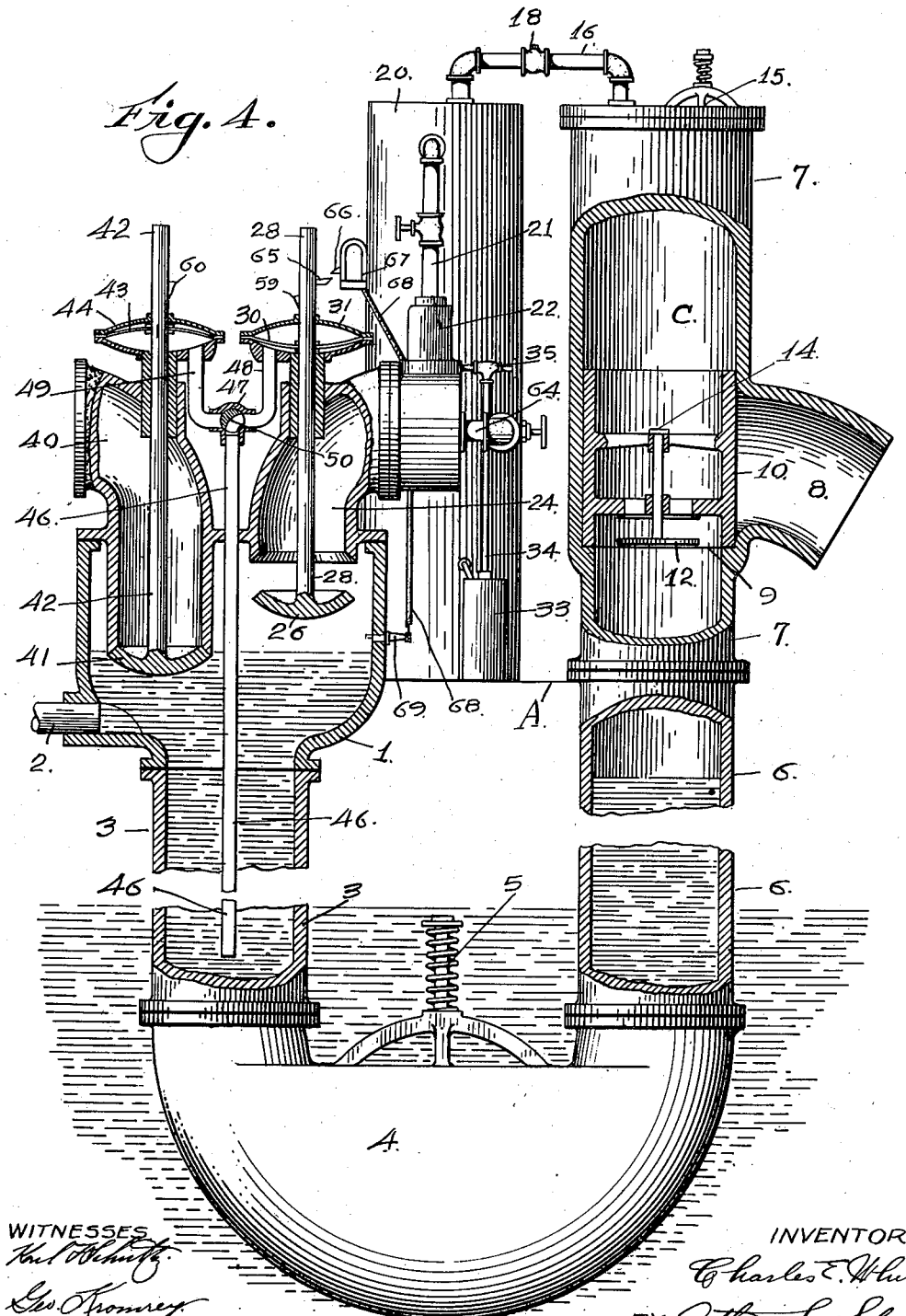

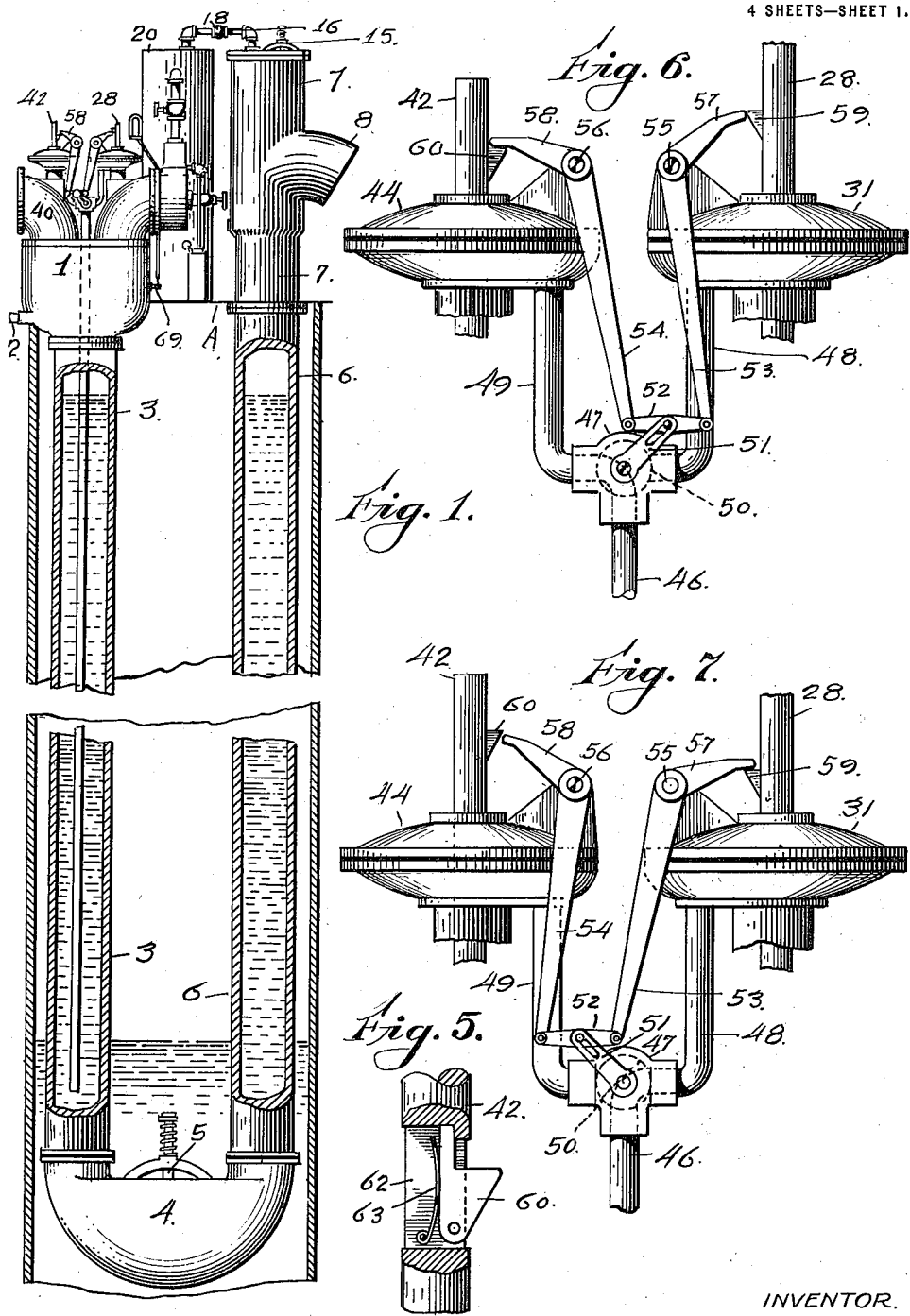

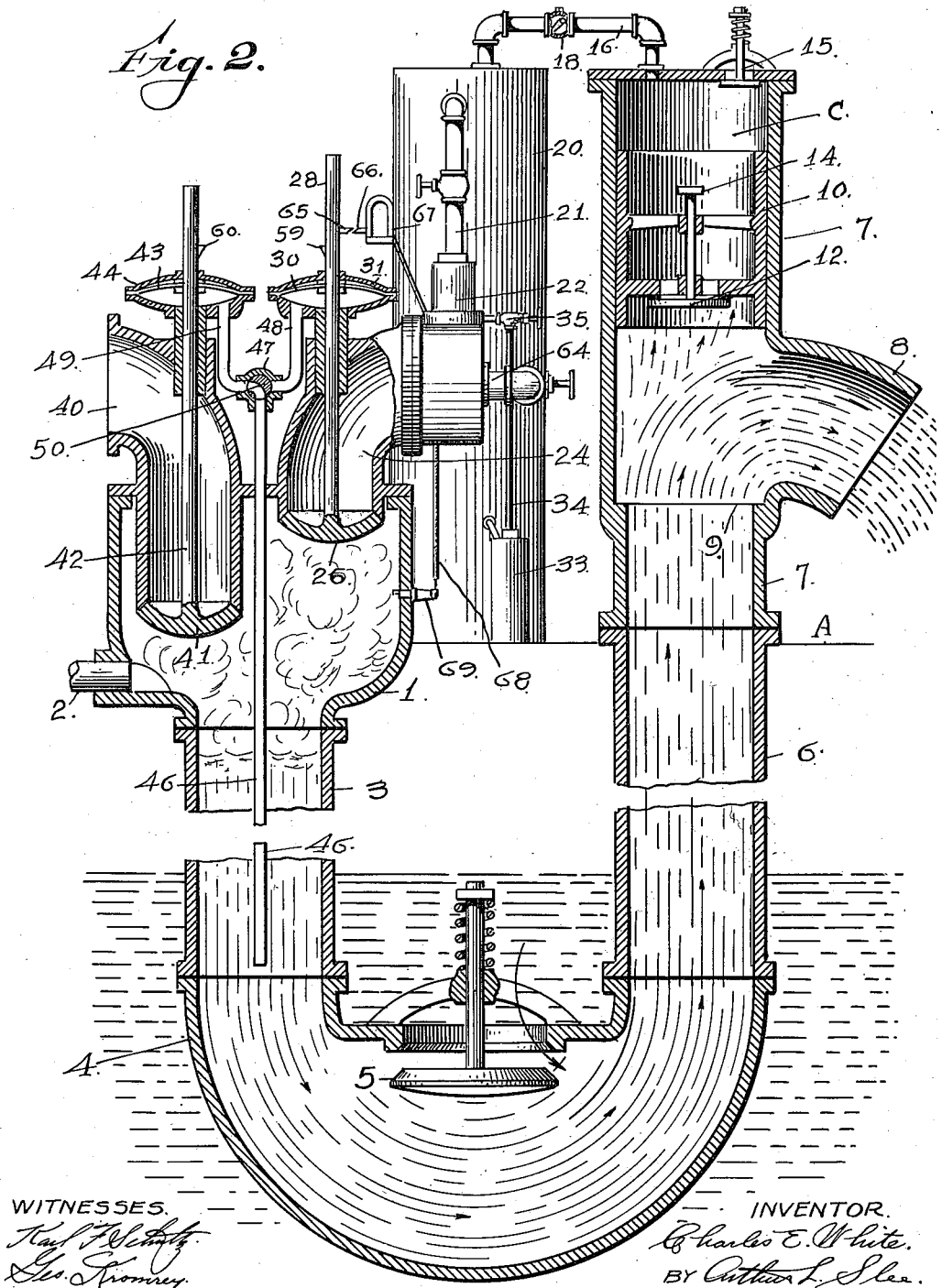

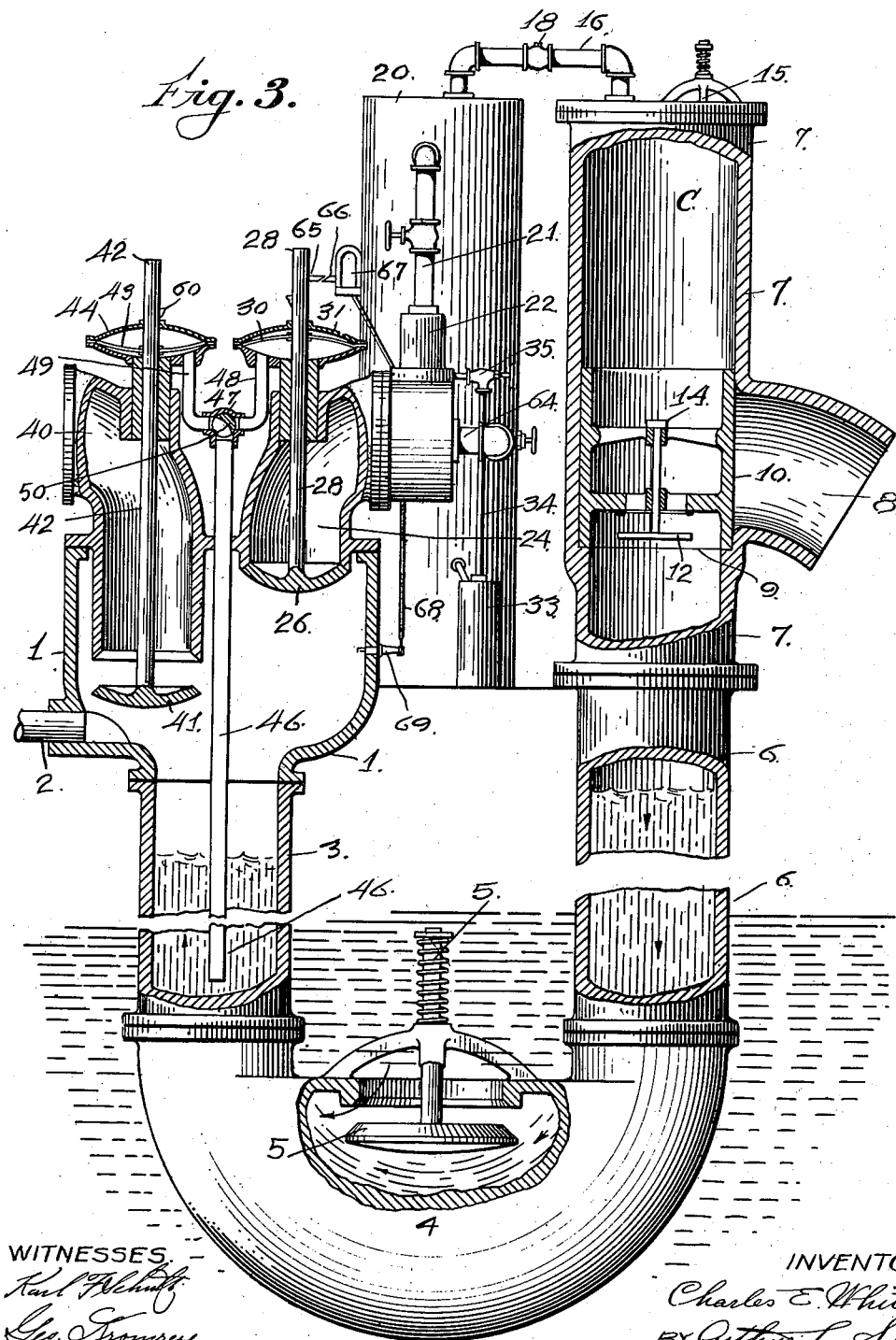

UNITED STATES PATENT OFFICE.

CHARLES E. WHITE, OF SAN FRANCISCO, CALIFORNIA.

INTERNAL-COMBUSTION PUMP.

1,157,071.

Specification of Letters Patent.

Patented Oct. 19, 1915.

Application filed November 13, 1913. Serial No. 801,275.

*To all whom it may concern:*

Be it known that I, CHARLES E. WHITE, a citizen of the United States, residing in the city and county of San Francisco and State of California, have invented a new and useful Improvement in Internal-Combustion Pumps, of which the following is a specification.

My invention relates to internal combustion pumps wherein parallel vertical pipes are united at the bottom and provided with a liquid intake valve thereat and a suitable discharge and compression chamber at the top of one pipe and a combustion chamber having intake and exhaust valves and means for operating and controlling the same at the top of the other pipe, and the objects of my invention are first, to provide parallel vertical pipes wherein the column of liquid in one pipe counterbalances the column of liquid in the other pipe for the purpose of reducing the energy required to raise the liquid in the discharge pipe, second, to keep the discharge normally closed for the purpose of compressing all of the air in the pipe above the liquid a portion of which is to be used for supplying the next combustion charge and also to use a portion of the air so compressed for the purpose of facilitating the return of the column of liquid to drive the burnt gases from the combustion chamber and to compress the combustible charge therein; third, to provide gas intake and exhaust valves that shall be controlled and operated by the column of liquid within the pipes; and fourth, to provide an internal combustion pump wherein the liquid shall be drawn into the pipes when the column of liquid therein moves in either direction. I accomplish these several features by means of the device illustrated in the drawings forming a part of the present specification, wherein like characters of reference designate similar parts throughout the said specification and drawings, and in which—

Figure 1 is a broken elevation, partly in section, of the pump within a deep well, disclosing the pump primed and the pipes nearly filled with liquid, the liquid in one pipe counter-balancing the liquid in the other pipe. Fig. 2 is an enlarged broken view of the pump, the greater part thereof being shown in section, disclosing the position of the several parts during the expansion of the combustible charge within the combustion chamber. Fig. 3 is a broken sectional view of the pump disclosing the position of the several parts during the return movement of the liquid within the pipes. Fig. 4 is a view similar to Fig. 3 disclosing the position of the several parts when the return movement of the column of liquid is nearly spent, the gas exhaust valve being closed and the gas intake valve being open to admit a charge of compressed gas. Fig. 5 is a broken detailed view on an enlarged scale, of one of the spring latches on the gas intake and exhaust valve stems which engages and operates the means for operating the three-way valve. Fig. 6 is a broken elevation of the mechanism for operating the three-way valve and Fig. 7 is a view similar to Fig. 6 with the parts shown in position.

I propose to place the combustion chamber nearly level with the liquid discharge and fill both pipes with liquid so that the column of liquid in one pipe will counterbalance the liquid in the other pipe and consequently less energy will be required to raise the level of the liquid a shorter distance to the discharge or the same amount of energy will raise a greater amount of liquid the same distance.

Referring to the drawings, the numeral 1 is used to designate a combustion chamber having a priming pipe 2 and secured to the upper end of the expansive pipe 3. A return bend 4 having a spring controlled liquid intake valve 5, is secured to the lower end of the expansion pipe 3 while a discharge pipe 6 is secured to the other outlet of the said return bend 4 having a compression pipe 7, with a liquid discharge 8 therein, secured to the upper portion thereof. The compression pipe 7 is provided with an annular seat 9 upon which the sleeve 10 rests. The sleeve 10 is provided with a gravity valve 12 the stem of which has a button 14 at the top thereof for the purpose of regulating the drop of the said valve 12. An air intake valve 15 is provided in the top of the compression pipe 7 for the purpose of admitting air to the compression chamber C when the sleeve 10 and the valve 12 therein drop to its seat. A pipe 16, having a check valve 18, connects the compression chamber C with the receiver 20. A pipe 21 connects the receiver 20 with the carbureter 22 which opens into the gas intake port 24. The gas intake port 24 is provided with a gas intake valve 26 the stem 28 of which is secured to a flexible diaphragm 30 within the housing 31. The gasolene tank 33 has a connection 34, controlled by the needle valve 35, to the carbureter 22.

The combustion chamber 1 is provided with a gas exhaust port 40 controlled by the exhaust valve 41, the stem 42 of which is secured to the flexible diaphragm 43 within the housing 44. A pipe 46, within the expansion pipe 3, leads to a threeway valve 47 which connects with the pipe 48, to the housing 31, and a pipe 49 which connects the said valve 47 with the housing 44. The cock 50, of the valve 47, is provided with a slotted arm 51, the said slot being engaged by a pin within the approximate center of a link 52, the ends of which are pivotally secured to the lower ends of the levers 53 and 54 which are pivotally secured, as at 55 and 56 to the housings 31 and 44 respectively. The upper ends 57 and 58 of the levers 53 and 54 are adapted to be engaged by the spring latches 59 and 60 of the stems 28 and 42 respectively. The said latches are controlled by a spring 63 within a slot 62 within each valve stem in such a manner that the upward movement of either stem will engage the upper end 57 or 58 of the corresponding lever 53 or 54 and move the same until the said latch passes beyond the arc in which the said end 57 or 58 moves. And when either stem moves downward, the latch 60 or 59 moves into the slot until the end 57 or 58 is passed when it will again be projected by the spring 63 beneath the said end. A by-pass connection 64 is provided between the compressed air receiver 20 and the gas intake port 24 for the purpose of regulating the mixture of gas between the carbureter 22 and the said intake port 24.

The operation is as follows: By means of the priming pipe 2 the expansion pipe 3 and the discharge pipe 6 are nearly filled with liquid until the level thereof reaches approximately the height indicated in Fig. 1 of the drawings, or slightly below the ground level A. A charge of compressed gas is introduced into the combustion chamber and ignited. The expansion of the ignited charge drives the liquid in the expansion pipe 3 downward and consequently the liquid in the discharge pipe 6 upward. As the liquid in the pipes 3 and 6 counterbalance each other the static pressure of the liquid in the pipe 6 is compensated or offset by the static pressure of the liquid in the pipe 3, consequently a comparatively small amount of energy is required to lift the liquid in the pipe 6 and force the same through the discharge 8 of the compression pipe 7. As the liquid in the pipe 6 moves upward it compresses the air above the liquid through the sleeve 10, until it reaches and closes the valve 12 in the said sleeve 10 and raises the said sleeve 10 and valve 12 therein above the discharge 8 at the same time compressing the air in the compression chamber C through the pipe 16 and check valve 18 into the receiver 20. The rapid passage of the liquid through the return bend 4 open the liquid intake valve 5 and draws the liquid to be raised into the said return bend 4 and into the discharge pipe 6. The downward movement of the liquid in the expansion pipe 3 acts on the lower end of the pipe 46 and creates a suction through the said pipe 46 and through the cock 50 of the valve 47 and pipe 49 to the housing 44. This suction acting on the under surface of the flexible diaphragm 43 secured within the said housing 44 and to the stem 42 of the exhaust valve 41, has a tendency to draw the said valve 41 downward which it does as soon as the expansion of the ignited gases in the combustion chamber 1 is completed, and opens the said exhaust valve 41 to the exhaust 40, as illustrated in Fig. 3 of the drawings. When the movement of the column of liquid within the discharge pipe 6 is spent, the valve 5 closes. At the same time the compressed air within the chamber C above the sleeve 10 acts downward on the said sleeve and moves the same onto its seat 9 thereby closing the discharge 8 and opening the valve 12 so that the said pressure of air above the sleeve 10 will be free to act on the liquid and force the same downward in the pipe 6 and upward in the pipe 3 thereby driving out the burnt gases from the expansion pipe 3 and the combustion chamber 1 until the liquid reaches the exhaust valve 41 and closes the same by impact. When the compression of the air from the chamber C is spent the continuation of the downward movement of the liquid within the pipe 6 creates a suction within the said compression chamber C and opens the air intake valve 15 and draws the air through the said valve 15 into the said compression chamber C and the discharge pipe 6. The rapid passage of the liquid due to the return movement of the column of liquid within the pipe 6 and return bend 4 causes the liquid intake valve 5 to be again opened, and the liquid to be raised is drawn therethrough and into the expansion pipe 3. When the exhaust valve 41 is closed by the return movement of the liquid the upward movement of the stem 42, of the said valve 41, causes the latch 60 thereon to engage the end 58 of the lever 54 and, by means of the link 52, which is secured to the arm 51 of the cock 50 within the threeway valve 47, moves the cock 50 so that the passage therein will provide communication with the pipe 48 of the housing 31, as illustrated in Figs. 4 and 7 of the drawings. This locks the water in the housing 44 as the cock 50 is turned to prevent the escape of the liquid therefrom, consequently, the exhaust valve 41 can not be opened until the cock 50 is again turned to the position indicated in Fig. 2 so that the water below the flexible diaphragm 43 can be removed. As the cock 50 is turned, by the closing of the exhaust valve 41, to connect the pipe 48 with the pipe 46 the liquid within the housing 31 is free to flow therefrom through the said pipe 48 and 46 and permit the opening of the gas intake valve 26 which is opened by the compressed charge within the intake port 24 and a charge of gas is thereby delivered into the combustion chamber 1 and further compressed by the momentum of the rising column of liquid within the said combustion chamber 1, until the pressure within the said combustion chamber 1 equals the pressure within the intake port 24, at which time the gas intake valve 26 is closed by the action of the rising column of liquid within the expansion pipe 3 acting against the flexible diaphragm 30 through the pipe 46, cock 50, valve 47 and pipe 48. As the stem 28 moves upward the spring latch 59 engages the end 57 of the lever 53 and, by means of the link 52 and the arm 51 of the cock 50, turns the cock 50 so that the connection between the pipe 46 and the pipe 48 is closed, thereby locking the liquid within the housing 31 and effectively preventing the opening of the gas intake valve 26 until the next charge is required. The upward movement of the stem 28 also causes the latch 65 thereon to engage the latch 66 of the magneto 67 which has a suitable electrical connection 68 to a spark plug 69 within the combustion chamber 1. At the end of the upward movement of the stem 28 the latch 65 releases the latch 66 and causes a spark in the said spark plug 69 which ignites the compressed charge within the combustion chamber 1 and drives the liquid through the pipes 3 and 6 as hereinbefore described, and the operation of raising the liquid and discharging the same is repeated.

Briefly, the successive operation are as follows: 1st. The compressed charge within the combustion chamber is ignited and the expansion thereof forces the balanced column of liquid within the pipes 3 and 6 toward the discharge 8 at the same time opening the liquid intake valve 5 by suction and drawing liquid into the said pipes and toward the discharge; compressing the air above the liquid within the discharge pipe 6 through the sleeve 10 and valve 12 therein; closing the valve 12; raising the sleeve 10, thereby opening the discharge 8, and forcing the liquid through the said discharge; removing the liquid from below the flexible diaphragm 43 within the housing 44 and thus unlocking and opening the exhaust valve 41. 2nd. The momentum of the column of liquid being spent the valve 5 within the return bend 4 closes; the compressed air within the compression chamber C forces the sleeve 10 and valve 12 therein downward until the sleeve 10 rests upon the seat 9 and closes the discharge 8, when the valve 12 is opened and the compressed air within the chamber C acting on the column of liquid between the intake valve 5 and valve 12 facilitates the return movement of the same, drawing liquid through the valve 5, driving the burnt gases from the expansion pipe 3 and combustion chamber 1 through the exhaust port 40; closing the exhaust valve 41, which turns the cock 50 to make connection between the housing 31 and the pipe 46, thereby releasing the liquid within the said housing and unlocking and opening the gas intake valve 26, and admitting a charge of compressed gas from the receiver 20, which has passed through the carbureter 22, into the combustion chamber 1, compressing the charge still further; and closing the gas intake valve 26 by means of the diaphragm 30. The upward movement of the stem 28 of the gas intake valve 26 shifts the cock 50 so that the liquid can not escape from the housing 31, thereby locking the said gas intake valve 26, and preventing the same from being opened until the time for the next charge to be admitted into the combustion chamber 1. The upward movement of the stem 28 also causes the latch 65 to engage the latch 66 and releases the said latch 66 at the same time that the said valve 26 is closed, which releases or opens the circuit and causes a spark to be produced at the spark plug 69 and ignite the charge within the combustion chamber 1.

It is obvious from the foregoing that I have provided improved means for elevating or raising a counterbalanced column of liquid which operates to draw the liquid to be raised into the discharge pipe; compresses the air above the liquid; opens the discharge and operates and controls the intake and exhaust valves of the combustion chamber, and draws liquid through the liquid intake valve when the column of liquid moves in either direction.

The details of construction being so susceptible to variation I do not wish to confine myself to the precise construction shown herein but rather to avail myself of any modification that may fall properly within the scope of my invention.

Having thus described my invention what I claim as new and desire to secure by Letters Patent is—

1. An internal combustion pump comprising a combustion chamber; a discharge; a suitable liquid intake; and means secured to the combustion chamber and the discharge and intake and adapted to contain a normally balanced column of liquid above the intake.

2. An internal combustion pump comprising a combustion chamber; a discharge; a suitable liquid intake; and parallel pipes secured to the combustion chamber and the discharge and intake and adapted to contain a normally balanced column of liquid above the intake.

3. An internal combustion pump comprising a combustion chamber; a discharge; parallel pipes secured to the combustion chamber and the discharge and adapted to contain a normally balanced column of liquid therein; and a suitable liquid intake secured to the lower ends of the parallel pipes and adapted to admit liquid into the parallel pipes when the column of liquid therein moves in either direction.

4. An internal combustion pump comprising a combustion chamber; a discharge; parallel pipes secured to the combustion chamber and the discharge and adapted to contain a normally balanced column of liquid therein; a suitable liquid intake secured to the lower ends of the parallel pipes and adapted to admit liquid into the said pipes when the column of liquid therein moves rapidly and continuously in either direction; and means adapted to normally close the discharge and to be opened by the upward movement of the column of liquid within the discharge pipe.

5. An internal combustion pump comprising parallel expansion and discharge pipes adapted to contain a normally balanced column of liquid therein; a suitable liquid intake secured to the lower ends of the parallel pipes; a compression pipe having a normally closed liquid discharge; and means for causing the column of liquid to rise in the discharge pipe and to compress the air above the liquid into a suitable receiver, to draw liquid into the said discharge pipe through the liquid intake and to open the normally closed discharge.

6. An internal combustion pump comprising a combustion chamber; a discharge; parallel expansion and discharge pipes secured to the combustion chamber and the discharge and adapted to contain a normally balanced column of liquid therein; a suitable liquid intake secured to the lower ends of the parallel pipes; and means secured to the upper end of the discharge pipe and operated by the rise of a column of liquid within the discharge pipe and adapted to react and to facilitate the return movement of the said column of liquid for the purpose of drawing liquid through the intake, driving the burnt gases from the combustion chamber, closing the exhaust valve therein, opening an intake valve within the said combustion chamber, and admitting a charge of gas into the said chamber, closing the intake valve, and compressing and igniting the charge so compressed.

7. In an internal combustion pump, the combination of a combustion chamber; an expansion pipe secured thereto; a return bend secured to the lower end of the expansion pipe and having a spring controlled liquid intake valve; a discharge pipe secured to the return bend; a compression pipe having a liquid discharge therein and secured to the upper end of the discharge pipe; a receiver having connections to the combustion chamber and the compression pipe; means for normally closing the liquid discharge and adapted to be raised by a column of liquid within the discharge pipe for the purpose of compressing the air above the said liquid into the receiver; and means operated and controlled by the return movement of a column of liquid within the expansion pipe and adapted to operate and control the exhaust and admission of gas into the combustion chamber, compressing the said gas and igniting the same.

8. In an internal combustion pump, the combination of a combustion chamber; and expansion pipe secured thereto; a priming pipe connected to the combustion chamber; a return bend having a spring controlled liquid intake valve therein and secured to the lower end of the expansion pipe; a discharge pipe secured to the return bend; a compression pipe having a spring controlled air intake valve and a liquid discharge therein; a receiver having connections to the combustion chamber and the compression pipe; a sleeve having a gravity valve therein mounted within the compression pipe and adapted to normally close the discharge and to be operated by a column of liquid within the discharge pipe for the purpose of compressing air above the said liquid within the said pipe into the receiver; gas intake and exhaust ports secured to the combustion chamber; gas intake and exhaust valves slidably secured within the said intake and exhaust ports; flexible diaphragms secured to the said intake and exhaust valves and adapted to be operated by the return movement of a column of liquid within the expansion pipe for the purpose of controlling and operating the said valves; and means for igniting a charge of gas within the combustion chamber.

In witness whereof I have hereunto set my signature in the presence of two subscribing witnesses.

CHARLES E. WHITE.

Witnesses:
   Geo. Schmitz,
   George M. Hench.